United States Patent
Kim et al.

(10) Patent No.: US 10,455,256 B2
(45) Date of Patent: *Oct. 22, 2019

(54) SYSTEM AND METHOD FOR PROVIDING IMAGE-BASED VIDEO SERVICE

(71) Applicant: ENSWERS CO., LTD., Seoul (KR)

(72) Inventors: Kil-youn Kim, Seoul (KR); Jaehyung Lee, Seoul (KR); Hoon-young Cho, Seongnam (KR)

(73) Assignee: Enswers Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,008

(22) Filed: Feb. 29, 2016

(65) Prior Publication Data
US 2016/0255380 A1    Sep. 1, 2016

Related U.S. Application Data

(63) Continuation of application No. 14/398,729, filed as application No. PCT/KR2013/001698 on Mar. 4, 2013, now Pat. No. 9,307,270.

(30) Foreign Application Priority Data

May 3, 2012    (KR) .................. 10-2012-0047112

(51) Int. Cl.
| | |
|---|---|
| G06Q 50/10 | (2012.01) |
| H04N 21/2183 | (2011.01) |
| H04N 21/254 | (2011.01) |
| H04N 21/2665 | (2011.01) |
| H04N 21/8352 | (2011.01) |
| H04N 21/8358 | (2011.01) |

(Continued)

(52) U.S. Cl.
CPC ..... *H04N 21/23418* (2013.01); *G06Q 20/123* (2013.01); *G06Q 50/10* (2013.01);
(Continued)

(58) Field of Classification Search
CPC ............ H04N 21/2183; H04N 21/254; H04N 21/2665; H04N 21/4828; H04N 21/6125;
(Continued)

(56) References Cited

U.S. PATENT DOCUMENTS 6,157,930 A * 12/2000 Ballard ............. G06F 17/30902
8,020,000 B2    9/2011 Oostveen et al.
(Continued)

FOREIGN PATENT DOCUMENTS

KR    10-2006-0051233    5/2006
KR    10-2007-0044251    5/2007
(Continued)

OTHER PUBLICATIONS

International Search Report for International Application No. PCT/KR2013/006198, dated Jun. 28, 2013.

*Primary Examiner* — Nathan J Flynn
*Assistant Examiner* — Caroline Somera
(74) *Attorney, Agent, or Firm* — McDonnell Boehnen Hulbert & Berghoff LLP (57) ABSTRACT

The present invention provides a system for providing image-based video service, including a cache system configured to store video information that matches image-related data; a fingerprint extraction unit configured to extract the fingerprint of an image corresponding to input image-related data; and a matching unit configured to determine video information that matches the fingerprint of the image extracted by the fingerprint extraction unit; wherein the system for providing image-based video service determines video information, matching image-related data received from a client terminal, via the cache system or the matching unit, and transmits video result information corresponding to the determined video information to the client terminal, and a method using the same.

19 Claims, 7 Drawing Sheets

(51) Int. Cl.
*H04N 21/234* (2011.01)
*G06Q 20/12* (2012.01)
*H04N 21/61* (2011.01)
*H04N 21/482* (2011.01)
*H04N 21/81* (2011.01)
*H04N 21/44* (2011.01)

(52) U.S. Cl.
CPC ....... *H04N 21/2183* (2013.01); *H04N 21/254* (2013.01); *H04N 21/2665* (2013.01); *H04N 21/4828* (2013.01); *H04N 21/6125* (2013.01); *H04N 21/8133* (2013.01); *H04N 21/8153* (2013.01); *H04N 21/8352* (2013.01); *H04N 21/8358* (2013.01); *H04N 21/44008* (2013.01)

(58) Field of Classification Search
CPC ........... H04N 21/8133; H04N 21/8153; H04N 21/8352; H04N 21/8358; H04N 21/44008; G06Q 20/123
USPC ...................................................... 725/1, 86
See application file for complete search history.

(56) References Cited

U.S. PATENT DOCUMENTS

| | | | |
|---|---|---|---|
| 9,026,615 | B1 | 5/2015 | Sirton et al. |
| 9,307,270 | B2 | 4/2016 | Kim et al. |
| 2008/0306871 | A1* | 12/2008 | Grannan ................. G06F 21/10 705/51 |
| 2011/0247042 | A1* | 10/2011 | Mallinson ......... G06F 17/30026 725/86 |
| 2011/0282906 | A1* | 11/2011 | Wong ................ G06F 17/30831 707/780 |
| 2012/0095958 | A1* | 4/2012 | Pereira .............. G06F 17/30029 707/609 |
| 2012/0110608 | A1* | 5/2012 | Berkowitz ........... H04N 21/812 725/14 |
| 2012/0278692 | A1* | 11/2012 | Shi ......................... H04L 67/02 715/205 |
| 2013/0188095 | A1* | 7/2013 | Hartson ............. H04N 5/44504 348/589 |
| 2013/0290465 | A1 | 10/2013 | Harrison |
| 2016/0110605 | A1* | 4/2016 | Holzschneider .. G06F 17/30256 382/103 |

FOREIGN PATENT DOCUMENTS

| | | |
|---|---|---|
| KR | 10-2007-0054601 | 6/2007 |
| KR | 10-2007-0060978 | 6/2007 |
| KR | 10-2007-0071633 | 7/2007 |
| KR | 10-2007-0082098 | 8/2007 |
| KR | 10-2007-0091587 | 9/2007 |
| KR | 10-2008-0051688 | 6/2008 |
| KR | 10-2009-0096158 | 9/2009 |

* cited by examiner

FIG. 3

| image ID | address information | expiration time information | video information (video ID, frame ID) |
|---|---|---|---|
| aaa | www.abc.com/def.html | 2012.05.02 AM 11:00 | Kkk, 35 |
| bbb | www.kkk.com/opp.html | 2012.05.05. PM12:00 | ttt, 28 |

| image ID | address information | expiration time information | video information (video ID, frame ID) | global hash key value |
|---|---|---|---|---|
| aaa | www.abc.com /def.html | 2012.05.02 AM 11:00 | Kkk, 35 | |
| bbb | www.kkk.com /opp.html | 2012.05.05. PM12:00 | ttt, 28 | |

FIG. 10

SYSTEM AND METHOD FOR PROVIDING IMAGE-BASED VIDEO SERVICE

CROSS REFERENCE TO RELATED APPLICATIONS

The present application is a continuation of U.S. patent application Ser. No. 14/398,729 filed Nov. 3, 2014, which is a U.S. National Phase application pursuant to 35 U.S.C. § 371 of International Application No. PCT/KR2013/001698 filed Mar. 4, 2013, which claims priority to Korean Patent Application No. 10-2012-0047112 filed May 3, 2012. The entire disclosure contents of these applications are herewith incorporated by reference into the present application.

TECHNICAL FIELD

The present invention relates to a system and method for providing image-based video service and, more particularly, to a system and method for providing video service to a client terminal based on an image present on a network, such as the Internet.

BACKGROUND ART

With the development of Internet technology and the diversification of service, various types of content services have been provided over the Internet. In particular, services using multimedia content, such as videos or advertisements, beyond the service of viewing various types of images over the Internet, have considerably increased. Furthermore, recently, with the rapid popularization of smart phones, cases where images and videos are provided over the Internet and a mobile communication network via smart phones have increased. Meanwhile, the provision and utilization of images as well as videos over a network have also increased. For example, images acquired by capturing the topical scenes of a popular soap opera or show program being broadcast are instantaneously distributed via the Internet notice-boards of a number of news sites, blogs, cafes, etc. immediately after the broadcast of the program. Furthermore, advertising images or images directly captured by users are being provided via SNS services, communities, the notice-boards of portal sites, etc. The reason for this is that posts including images can attract the attention of users more than text-centric posts.

As described above, it is not easy to associate images with videos or provide various types of associated additional services based on images in spite of a situation in which an enormous number of images are being provided over the Internet. The reason for this is that there is no method capable of identifying videos or other additional services corresponding to images over a network in real time.

For example, a user may view a news article, including an image acquired by capturing a scene of a soap opera, over the Internet, and then may want to immediately watch the scene including the corresponding image via a video. In this case, currently, the user should additionally search a web site that provides the corresponding video. Furthermore, even in such a case, the scene desired by the user is not accurately provided, and thus the user should personally search the provided video for the scene desired by him or her.

In this regard, there is a need for a method capable of providing videos or various types of additional services to client terminals based on images distributed over a network, such as the Internet or a mobile communication network, in an automated manner or in real time.

Meanwhile, Korean Patent Application Publication No. 10-2009-0096158 (published on Sep. 10, 2009) discloses a "Video Still Cut-based Cross-Media Search System and Method." In this publication, there are disclosed a method and system for receiving a still cut, that is, a search target, extracting image features by analyzing the input still cut, searching for associated webpage information based on the extracted image feature information by referring to a webpage database (DB) containing the per-frame image feature information of video still cuts included in meta information about webpages and webpages themselves, and then providing found webpage information.

However, this preceding technology is merely a technology for simply searching for and providing a webpage or video information corresponding to an input image, and has its limitations in terms of accurate searching for a video and a frame corresponding to an image based on the image provided by a client terminal and the provision of a video service corresponding to the corresponding video and frame.

Technical Problem

Accordingly, the present invention has been made keeping in mind the above problems occurring in the prior art, and an object of the present invention is to provide a system and method that can accurately determine a video or a frame corresponding to an image over a network, such as the Internet or a mobile communication, in real time and accurately perform playback from the corresponding video or frame.

Another object of the present invention is to provide a cache system on a server side, preferentially determine a matching result using the cache system, and perform a fingerprint extraction and matching only when there is no match, thereby more rapidly and accurately providing video result information.

A further object of the present invention is to construct a cache system using address information or expiration time information as image-related data related to an image, and store the results of fingerprint extraction and matching in association with the address information or expiration time information in the cache system, thereby considerably rapidly providing a matching result compared to a conventional technology.

Yet another object of the present invention is to provide a system and method that provide video result information to a client based on image-related data input from a client side and provide a user interface for enabling the client to receive a video service based on the video result information, thereby enabling a user to conveniently and efficiency receive a video service.

Technical Solution

In order to accomplish the above objects, the present invention provides a system for providing image-based video service, including a cache system configured to store video information that matches image-related data; a fingerprint extraction unit configured to extract the fingerprint of an image corresponding to input image-related data; and a matching unit configured to determine video information that matches the fingerprint of the image extracted by the fingerprint extraction unit; wherein the system for providing image-based video service determines video information, matching image-related data received from a client terminal, via the cache system or the matching unit, and transmits video result information corresponding to the determined video information to the client terminal.

In this case, the system for providing image-based video service may preferentially determine the video information, matching the image-related data received from the client terminal, via the cache system, and may determine the video information via the fingerprint extraction unit and the matching unit when the video information has not been determined by the cache system.

Furthermore, the image-related data may include address information indicative of a location where an image corresponding to the image-related data is present on a network, and the cache system may include a cache table configured to store video information corresponding to the address information.

Furthermore, the image-related data may further include expiration time information indicative a time until which the image corresponding to the image-related data is valid on the network.

Furthermore, the cache system may determine the video information stored in the cache table if expiration time information received from the client terminal is identical to the expiration time information stored in the cache table, and may not determine the video information if the expiration time information received from the client terminal is not identical to the expiration time information stored in the cache table.

Furthermore, the video information may include a video identifier (ID) that matches the image corresponding to the image-related data.

Furthermore, the video information may further include a frame ID of a video that matches the image corresponding to the image-related data.

Furthermore, the fingerprint extraction unit may connect to an image server corresponding to address information included in the image-related data received from the client terminal, may acquire image data corresponding to the image-related data and image-related data, and may extract a fingerprint for the acquired image data.

Furthermore, the matching unit may identify video information matching the extracted fingerprint by referring to a fingerprint database, and may determine the identified video information to be video information corresponding to the image-related data.

Furthermore, the determined video information may be transmitted to the cache system, and may be stored in association with the image-related data in the cache table.

Furthermore, the identified video information may include a frame ID matching the fingerprint and a video ID including the frame ID.

Furthermore, the video result information may include the determined video information.

Furthermore, the video result information may further include address information about an address where the video data is present in the video service server with respect to the determined video information.

Furthermore, the video result information may include a signal indicating that the video information has been determined.

Furthermore, the client terminal may transmit a video service provision request signal to a video service provision server based on the video result information received from the system for providing image-based video service, and may receive and play back video data in response to the video service provision request signal.

Furthermore, the client terminal may include an image-related data acquisition unit configured to acquire image-related data related to an image that is provided by an image server to which the client terminal connects; an interface management unit configured to provide a user selection interface to the display unit of the client terminal based on the video result information transmitted by the system for providing image-based video service; and a video playback unit configured to, when a user event occurs via the user selection interface, transmit the video service provision request signal to the video service provision server and receive and play back the video data transmitted by the video service provision server.

Furthermore, the image-related data acquired by the image-related data acquisition unit may include address information indicative of a location where an electronic document including the image is present in the image server.

Furthermore, the image-related data may further include expiration time information.

Furthermore, the video playback unit, when a user event occurs via the user selection interface, may transmit the video service provision request signal to the video service provision server, and may provide a video playback interface for receiving and playing back video data via the display unit.

Furthermore, the video playback interface may be provided at a location that is determined based the location information of the image that is displayed on the display unit of the client terminal.

Furthermore, the fingerprint extraction unit may segment the image data acquired from the image server into at least one or more pieces of segment image data, and may extract a fingerprint for each of the pieces of segment image data; and the matching unit may identify at least any one of a plurality of pieces of video information, matching the respective pieces of segment image data, as video information, and may determine the identified video information to be the video information corresponding to the image-related data.

Furthermore, the matching unit may identify video information, corresponding to most frequent video and frame IDs of IDs and video and frame IDs included in the pieces of video information, as the video information.

Furthermore, the matching unit may identify all the pieces of video information as the video information, may determine all the identified pieces of video information to be the video information, and may store the determined pieces of video information in the cache table.

Furthermore, the interface management unit of the client terminal may receive a plurality of pieces of video result information from the system for providing image-based video service, may provide a plurality of pieces of video list information corresponding to the received pieces of video result information along with the user selection interface, and may generate a user event when a user selects any one of the plurality of pieces of video list information.

Furthermore, the cache table may be updated at regular intervals based on a hash value of image data.

In accordance with another aspect of the present invention, there is provided a method of providing image-based video service to a client terminal in a system for providing image-based video service, the method including step 1 of receiving image-related data from a client terminal; step 2 of determining video information matching the received image-related data using a cache system; step 3 of, when the matching video information has not been determined at step 2, extracting a fingerprint of an image corresponding to the received image-related data, and determining video information that matches the extracted fingerprint of the image;

and step 4 of transmitting video result information, corresponding to the video information determined at step 2 or 3, to a client terminal; wherein the client terminal receives video service based on the received video result information.

In this case, the cache system may include a cache table configured to store video information corresponding to image-related data; and step 2 may include determining the video information matching the received image-related data using the cache table.

Furthermore, the image-related data may include address information indicative of a location where an image corresponding to the image-related data is present on a network; and step 2 may include determining the video information using the cache table based on the address information received the client terminal.

Furthermore, the image-related data may further include expiration time information indicative of a time until which an image corresponding to the image-related data is valid on a network; and step 2 may include determining the video information, corresponding to the address information and the expiration time information received from the client terminal, using the cache system.

Furthermore, step 2 may include, when the address information is present in the cache system, comparing the expiration time information received from the client terminal with expiration time information stored in the cache system, and determining video information corresponding to the address information to be matching video information if the expiration time information received from the client terminal is identical to the expiration time information stored in the cache system.

Furthermore, if, as a result of the comparison, the expiration time information received from the client terminal is not identical to the expiration time information stored in the cache system, it may be determined that there is no matching video information, and step 2 may be performed.

Furthermore, the video information stored in the cache table may include a video identifier (ID) that matches the image corresponding to the image-related data.

Furthermore, the video information may further include the frame ID of a video that matches the image corresponding to the image-related data.

Furthermore, step 3 may include step 3-1 of connecting to an image server corresponding to the address information included in the image-related data received from the client terminal, and acquiring image data corresponding to the image-related data and image-related data; step 3-2 of extracting a fingerprint for the acquired image data; step 3-3 of identifying video information that matches the extracted fingerprint; and step 3-4 of determining the identified video information to be the video information corresponding to the image-related data and storing the determined video information in association with the image-related data in the cache system.

Furthermore, the video information identified at step 3-3 may include a frame ID matching the fingerprint and a video ID including the frame ID.

Furthermore, the video result information of step 4 may include the determined video information.

Furthermore, the video result information of step 4 may further include address information about an address where the video data is present in the video service server with respect to the determined video information.

Furthermore, the video result information may include a signal indicating that the video information has been determined.

Furthermore, a video may be received, after step 4, through step 5 of providing a user selection interface for receiving a user event to the display unit of the client terminal; step 6 of, when a user event input via the user selection interface occurs, transmitting a video service provision request signal to a video service provision server based on the video result information; and step 7 of receiving video data received in response to the video service provision request signal and playing back the video data via the display unit.

Furthermore, a video playback interface for receiving and playing back video data may be provided via the display unit after step 6, the video playback interface being provided at a location that is determined based location information of the image that is displayed on the display unit of the client terminal.

Furthermore, step 3-2 may include segmenting the image data acquired from the image server into at least one or more pieces of segment image data and extracting a fingerprint for each of the pieces of segment image data; and step 3-3 may include identifying at least any one of a plurality of pieces of video information, matching the respective pieces of segment image data, as video information, and determining the identified video information to be the video information corresponding to the image-related data.

Furthermore, step 3-3 may include identifying video information, corresponding to the most frequent video and frame IDs of IDs and video and frame IDs included in the pieces of video information, as the video information.

Furthermore, step 3-3 may include identifying all the pieces of video information as the video information, determining all the identified pieces of video information to be the video information, and storing the determined pieces of video information in the cache table.

Furthermore, the client terminal may receive a plurality of pieces of video result information from the system for providing image-based video service, may provide a plurality of pieces of video list information corresponding to the received pieces of video result information along with the user selection interface, and may generate a user event when a user selects any one of the plurality of pieces of video list information.

Furthermore, the cache system may be updated at regular intervals based on the hash value of image data.

Advantageous Effects

According to the present invention, there are provided a system and method that can accurately determine a video or a frame corresponding to an image over a network, such as the Internet or a mobile communication, in real time and accurately perform playback from the corresponding video or frame.

Furthermore, the present invention has the advantage of providing a cache system on a server side, preferentially determining a matching result using the cache system, and performing fingerprint extraction and matching only when there is no match, thereby more rapidly and accurately providing video result information.

Furthermore, the present invention constructs a cache system using address information or expiration time information as image-related data related to an image, and stores the results of fingerprint extraction and matching in association with the address information or expiration time information in the cache system, thereby considerably rapidly providing a matching result compared to a conventional technology.

Moreover, the present invention can provide a system and method that provide video result information to a client based on image-related data input from a client side and provide a user interface for enabling the client to receive a video service based on the video result information, thereby enabling a user to conveniently and efficiency receive a video service.

BEST MODE

Embodiments of the present invention are described in detail below with reference to the accompanying drawings.

Figure 1:
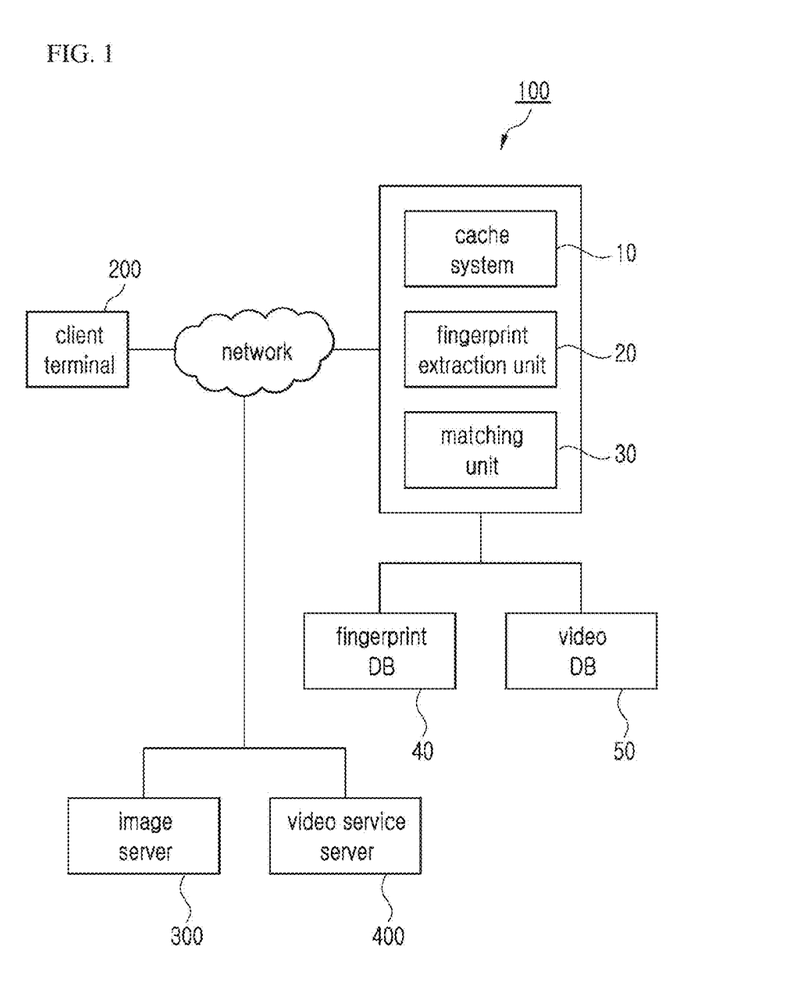
FIG. 1 is a diagram illustrating the configuration and connection state of a system for providing image-based video service according to an embodiment of the present invention.

FIG. 1 is a diagram illustrating the configuration and connection state of a system 100 for providing image-based video service (hereinafter referred to as the "video service provision system") according to an embodiment of the present invention.

Referring to FIG. 1, the video service provision system 100 of the present embodiment includes a cache system 10, a fingerprint extraction unit 20, and a matching unit 30. The video service provision system 100 further includes a fingerprint database 40, and a video database 50. Furthermore, the video service provision system 100 is connected to a client terminal 200, an image server 300, and a video service server 400 over a network.

First, the overall operation of the video service provision system 100 is schematically described as follows. That is, the client terminal 200 connects to the image server 300 and then receives an electronic document including an image over a network. At this time, the client terminal 200 acquires image-related data related to the image, and then transmits the image-related data to the video service provision system 100. The video service provision system 100 determines video information matching the received image-related data, and provides video result information corresponding to the determined video information to the client terminal 200. The client terminal 200 transmits a video provision request signal to the video service server 400 based on the received video result information and then receives video data corresponding to the signal from the video service server 400, thereby receiving a service, such as video playback.

In this case, the network is, for example, the Internet, a public switched telephone network (PSTN), a mobile communication network or a combination thereof, and refers to a well-known network.

The image server 300 is a well-known server that functions to provide an electronic document (webpage) including an image to the client terminal 200 over a network. For example, the image server 300 may be a web server that provides a web service, as the service of a portal site, over the Internet. The image server 300 provides an electronic document (a webpage) including an image to the client terminal 300 over a network using a well-known method. In the present specification, the image server 300 has been named by considering that it provides an image that is an important element in the present invention. It will be apparent that the image server 300 may provide other types of electronic documents, such as a video, text, etc., in addition to an image.

That is, in connection with the present invention, the image server 300 refers to a server that functions to hold an electronic document including an image and provide the electronic document including an image to the client terminal 200 via a connection with the client terminal 200. All types of servers that perform such a function are included in the image server 300 in the present invention. The image server 300 may be various web servers distributed over a network, and may be included in and configured within the video service provision system 100.

The video service server 400 functions to transmit video data to the client terminal 200 in response to a video provision request signal received from the client terminal 200. Although the video service server 400 is illustrated as a component separate from the video service provision system 100 in FIG. 1, it will be apparent that the video service server 400 may be included within and integrated with the video service provision system 100.

Next, the internal configuration of the video service provision system 100 is described.

The cache system 10 of the video service provision system 100 functions to store video information matching image-related data and preferentially determine video information matching image-related data received from the client terminal 200. If video information is not determined by the cache system 10, the video information is determined by the fingerprint extraction unit 20 and the matching unit 30, which will be described later. The cache system 10 contains a cache table in which video information is stored in association with image-related data in order to determine the video information.

In this case, the image-related data refers to data related to an image, and may be, for example, address information related to a location where an image is present on a network, that is, the URL information of an image or a webpage including an image that the client terminal 200 is receiving (in FIG. 1, the URL information of the image server 300 that provides an electronic document including an image).

Figure 2:
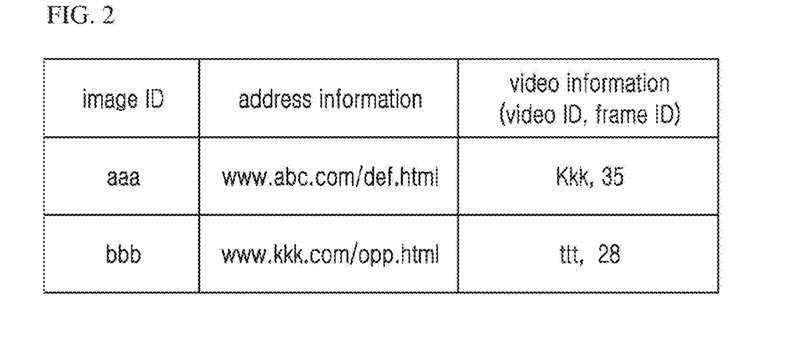
FIGS. 2 and 3 illustrate examples of a cache table according to the present invention.

FIG. 2 is a diagram of an example of a cache table according to the present invention, and illustrates an example in which image-related data is address information. Referring to FIG. 2, it can be seen that the cache table has been configured to include an image identifier (ID), address information and video information. In this case, it can be seen that the image-related data includes address information (URL information) indicative of a location where an image is present on a network, as described above. The image ID functions as an identifier assigned to each piece of image-related data, that is, each piece of address information.

The video information may include a video ID, and a frame ID. The video ID refers to an ID indicative of a video corresponding to (matching) a corresponding image ID, and the frame ID refers to an ID indicative of a frame of a video matching a corresponding image ID. In this case, the frame ID may refer to time information in a video corresponding to a corresponding frame. Referring to FIG. 2, it can be seen that an image ID corresponding to the address information (image-related data) "www.abc.com/def.html" is "aaa," a video ID matching the corresponding image ID is "kkk," and a matching frame ID is "35." This means that the corresponding image ID "aaa" matches the 35-th frame of a video having a video ID of "kkk." Although the frame ID has been configured to be indicative of a sequential position in FIG. 2, the frame ID may be configured using time information. For example, the frame ID may be configured using information about the time at which a corresponding frame is present in the total length of a video (for example, 01:35:08 (hours:minutes:seconds)). This frame ID is information that is used to provide a service, such as video playback from the corresponding frame, in the case of providing a service, such as video playback or the like, to the client terminal 200.

Such a cache table may be constructed by the fingerprint extraction unit 20 and the matching unit 30. When video information corresponding to image-related data cannot be determined as in the case where image-related data is not present in the cache table, as will be described later, the fingerprint extraction unit 20 and the matching unit 30 extracts a fingerprint for an image corresponding to given image-related data, identifies a video ID and a frame ID matching the fingerprint, and then determines video information for the given image-related data. The cache system 10 receives this determined video information, and records it in the cache table. In this case, the fingerprint extraction unit 20 and the matching unit 30 refer to the fingerprint database 40 for storing fingerprints for videos and frames constituting the videos and the video database 50 for storing data and IDs for the videos.

It will be apparent that the cache table may be constructed through the acquisition of image-related data on electronic documents including images distributed over a network using a technology, such as a crawler or the like, and the configuration of video information corresponding to the image-related data, in addition to the determination of video information for given image-related data provided by the client terminal 200.

Meanwhile, in the present invention, expiration time (expiry time) information may be further included as the image-related data. Generally, the expiration time information refers to information about the time that is set by a web server for providing an electronic document so that the corresponding electronic document is valid until the time, and is information that is included in the corresponding electronic document or provided by a web server when a client connects to the web server. The web server may reject a web service request made after the expiration time based on the expiration time information, and the client uses the expiration time information to determine whether to use local data stored in the client or to newly receive data from the web server by comparing the expiration time information with cache data stored in the client itself. Since such expiration time information itself is known as conventional technology and is not a direct target of the present invention, a detailed description thereof is omitted herein.

Figure 3:
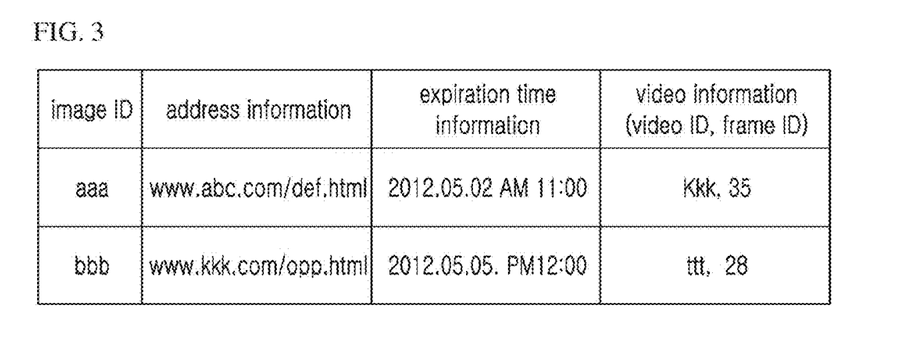

FIG. 3 illustrates another example of the cache table according to the present invention, and illustrates an example of a case where image-related data includes address information and expiration time information. The cache table of FIG. 3 is different from that of FIG. 2 in that expiration time information is included as image-related data. Referring to FIG. 3, the image ID "aaa" has the expiration time information "2012.05.02.AM 11:00," which means that the corresponding image ID is valid until the corresponding time in connection with the corresponding address information. Ultimately, this means that an electronic document corresponding to the corresponding address information "www.abc.com/def.html" is valid only until the corresponding time.

The expiration time information is used to process a case where the address information of a webpage is kept the same but an image on the corresponding webpage is updated, and the processing may be performed using a method that is described below.

That is, if address information transmitted by the client terminal 200 is present in the cache table, it is determined that expiration time information transmitted by the client terminal 200 is identical to expiration time information stored in the cache table. If they are identical to each other, video information stored for the corresponding image-related data is provided as a result. If they are not identical to each other, the stored video information is ignored, and then a result indicating that the video information is not present is provided. That is, a result indicating that the video information has not been determined is provided, and accordingly the video service provision system 100 performs matching processing related to the image-related data via the fingerprint extraction unit 20 and the matching unit 30, as will be described later. The fact that pieces of expiration time information are not identical to each other means that expiration time stored in the cache table is different from expiration time information input as the image-related data. The reason for this is that this may indicate that a corresponding webpage has been updated or an image of a corresponding webpage has been updated. If this is not taken into account, video information stored in the cache table is provided to the client terminal 200 without change. In this case, this video information may be information that does not accurately match a current webpage.

Meanwhile, address information and expiration time information may be acquired by a corresponding electronic document (a webpage) or a web server as the image-related data. As described above, the image server 300 provides an electronic document including an image to the client terminal 200 that connects over a network. In this case, the image-related data acquisition unit 210 (see FIG. 4) of the client terminal 200 acquires image-related data from a provided image and electronic document.

Meanwhile, if required, the image-related data may further include data about an image itself generated in a specific file format to represent the image, information related to the image (a title (a file name), a date of creation, size information, etc.), image meta information, such as a text description on a webpage including the image when the image is provided via a webpage, etc. Meanwhile, the image refers to a still image represented in a well-known file format, for example, jpg, gif, tif, bmp, or the like.

Next, the fingerprint extraction unit 20 is described. The fingerprint extraction unit 20 functions to determine video information matching corresponding image-related data along with the matching unit 30 when the cache system 10 has not determined the video information corresponding to the image-related data transmitted by the client terminal 200, as described above.

First, the fingerprint extraction unit 20 connects to the image server 300 corresponding to address information included in the image-related data received from the client terminal 200, acquires image data and image-related data corresponding to the image-related data, and then extracts a fingerprint for the acquired image data. In this case, the image data refers to data on the image itself. For example, when the image data is in a jpg file form, the image data may be data on a corresponding file itself. Furthermore, the image-related data may include address information and expiration time information, as described above. If required, other related data may be acquired in addition to address information and expiration time information.

Meanwhile, in this case, the fingerprint refers to feature data indicative of the feature of data, such as audio data, image data or video data, and may be also referred to as fingerprint data, DNA data or gene data. Various conventional technology-based methods have been proposed as a technology for extracting fingerprints and comparing data using the fingerprints. Since data identity can be easily determined using fingerprints, fingerprints have been widely used recently in the field of digital rights management (DRM), etc. For example, in the case of audio data, fingerprints may be generated using various types of feature data (for example, frequency, amplitude, etc.) representative of the features of audio data, and, in the case of images or video data, fingerprints may be generated using various types of feature data (for example, the motion vector information, color information, etc. of frames) on the images or the video data. The present invention is not directed to a method of generating a fingerprint itself and any type of conventional technology-based fingerprint generation/extraction method may be used without change, a detailed description thereof is omitted herein. According to Korean Patent Application Nos. 10-2007-0044251 (entitled "Audio Fingerprint Data Generation Method and Apparatus, and Audio Data Comparison Method and Apparatus using the Same"), 10-2007-0054601 (entitled "Method and Apparatus for Determining Video Data Identify and Detecting Identical Sections"), 10-2007-0060978 (entitled "Method and System for Clustering Identical Video Data"), 10-2007-0071633 (entitled "Method and Apparatus for Providing Video Data Search Service Using Video Data Cluster"), 10-2007-0091587 (entitled "Method and Apparatus for Setting and Providing Advertising Data Using Video Data Cluster"), and 10-2008-0051688 (entitled "Video Processing Method and Apparatus") filed by the present applicant, methods of generating the fingerprints of audio, image or video data and methods of comparing data using such fingerprints are described. It will be apparent that the fingerprint generation and extraction methods of the present applicant may be used in the present invention. In brief, in the present invention, a conventional known fingerprint generation/extraction technology may be used without change regardless of the fingerprint extraction scheme of the technology.

Once the fingerprint extraction unit 20 has extracted the fingerprint, the matching unit 30 identifies video information matching the extracted fingerprint by referring to the fingerprint database 40, and then determines the identified video information to be video information corresponding to image-related data. The fingerprint database 40 is a database that stores fingerprints for videos and frames constituting the videos. The matching unit 30 may identify a video ID matching given image-related data and a frame ID of the corresponding video by referring to the fingerprint database 40. Since a method of performing matching by comparing fingerprints itself is not a direct target of the present invention and a conventional technology can be used as the method without change, a detailed description thereof is omitted herein. That is, in the present invention, fingerprint extraction, comparison and matching are not limited to particular methods, and conventional technologies can be used without change. For example, the n-best method may be used as a matching method. That is, a plurality of video IDs and frame IDs having a fingerprint matching a given single fingerprint are scored and then selected, and a video ID and a frame ID having the highest score among the results may be determined to be video information matching the given fingerprint.

After the matching has been completed, video information (a video ID and a frame ID) matching the extracted fingerprint is determined. The matching unit 30 transmits the determined video information to the cache system 10, so that the determined video information can be newly stored in association with image-related data in the cache table, thereby providing for the processing of a request from the client terminal 200 in the future. As described above, the video ID is the ID of a video including a frame matching a corresponding image, and the frame ID is an ID indicative of a location where a frame is present in a corresponding video. According to this information, a specific frame of a specific video corresponding to an image can be accurately determined. Accordingly, the client terminal 200 can determine a specific frame of a specific video corresponding to image-related data using the information, and thus can receive the service of video playback from the specific frame of the specific video, as will be described later.

As described above, once the video information has been determined via the cache system 10 or matching unit 30 of the video service provision system 100, video result information corresponding to the video information is transmitted to the client terminal 200. The client terminal 200 transmits a video service provision request signal to the video service server 400 based on the received video result information, and then receives and plays back video data in response to the video service provision request signal.

In this case, the video result information may include the determined video information. As described above, the video information may include a video ID and a frame ID. The video ID and the frame ID may be transmitted to the client terminal 200 as video result information. In addition to this, information about a location where the corresponding video ID is present in the video service server 400, that is, the address information (URL information) of the video service server 400 indicative of a location from which video data, can be received so that the client terminal 200 can connect to the location and view the corresponding video may be included. Although the video service server 400 has been illustrated as a separate element in FIG. 1, it will be apparent that the video service server 400 may be included in and configured within the system 100. In this case, the video service server 400 may be the video database 50.

Meanwhile, the video result information is simply a signal indicating that the video information has been determined. In this case, the client terminal receives the corresponding signal, connects to the system 100, and transmits a video provision request signal. In this case, the system 100 determines the location of a corresponding video via the video information, and may transmit video data to the client terminal 200 from the location of the corresponding video or may transmit address information indicative of the location of the corresponding video to the client terminal 200, so that the client terminal 200 can connect to the corresponding address information and receive video data.

Next, the configuration of the client terminal 200 is described.

As described above, as its one feature, the client terminal 200 acquires image-related data from the image server 300, transmits the image-related data to the system 100 and receives video result information from the system 100, and then transmits a video service provision request signal to the video service server 400 based on the video result information, receives video data from the video service server 400 and plays back the video data.

The client terminal 200 has the function of connecting to a network and transmitting and receiving data, and may be, for example, a computer, a mobile communication terminal, a smart phone, or the like. Furthermore, the client terminal 200 includes a display unit, and receives an electronic document including an image from the image server 300 and then displays the received electronic document and the image included in the received electronic document via the display unit.

The client terminal 200 further includes the following configurations in order to perform the features described above in connection with the present invention in addition to the well-known configuration, which is described with reference to FIG. 4.

Figure 4:
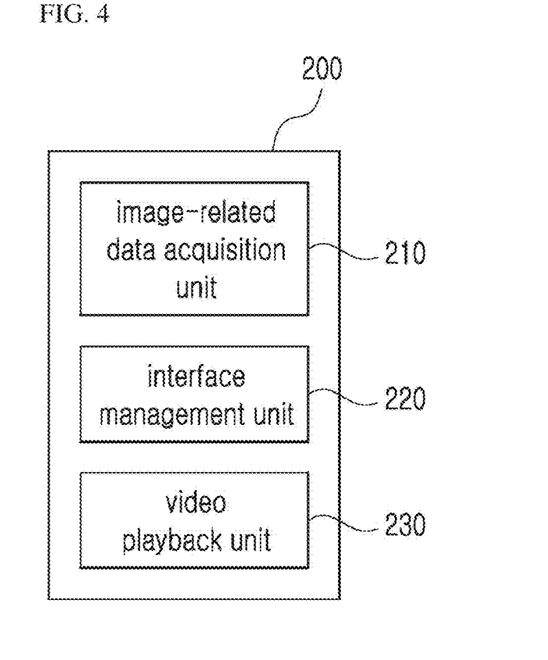
FIG. 4 is a configuration diagram of the internal configuration of an embodiment of a client terminal according to the present invention.

FIG. 4 is a configuration diagram of the internal configuration of an embodiment of the client terminal 200 according to the present invention. Referring to FIG. 4, the client terminal 200 includes an image-related data acquisition unit 210, an interface management unit 220, and a video playback unit 230.

The image-related data acquisition unit 210 functions to acquire image-related data on an image that is provided by the image server 300 to which the client terminal 200 connects. The image-related data may include address information and expiration time information, as described with reference to the cache table of the cache system 10.

The client terminal 200 connects to the image server 300, and then receives an electronic document including an image (a webpage) from the image server 300. In this case, the image-related data acquisition unit 210 of the client terminal 200 acquires image-related data on the received image, and then transmits the image-related data to the video service provision system 100. The image-related data acquisition unit 210 may be implemented in the form of hardware or software for performing the function. In particular, when the client terminal 200 is a smart phone, the image-related data acquisition unit 210 may be implemented in the form of an application.

Furthermore, the image-related data acquisition unit 210 may be included and implemented in a browser program by implementing a corresponding function in an Internet browser program (for example, Internet Explorer, Chrome, Safari, or the like), included in the client terminal 200, in the form of a plug-in. When the image-related data acquisition unit 210 has been implemented in the form of a plug-in, the image-related data acquisition unit 210 operates as follows. When a user connects to a desired web site (the image server 300) by running (executing) the Internet browser program and receives a webpage, the browser program receives the webpage and displays the webpage via the display unit. In this case, the corresponding plug-in determines whether an image has been included in the corresponding webpage, and acquires image-related data related to the corresponding image if the image has been included in the webpage. This may be acquired by analyzing the source code (for example, HTML) of the corresponding webpage or using data transmitted and received during the process of connecting to the web server image server 300. Since a method of implementing the image-related data acquisition unit 210 in the form of a plug-in itself is well known by a well-known method, a detailed description thereof is omitted herein.

Meanwhile, image-related data may include address information related to a location where an image is present on a network, for example, the URL information of an image or a webpage including an image that the client terminal 200 is receiving, as described above. Furthermore, the image-related data may further include expiration time information, such as that described above. The address information and the expiration time information may be acquired via header data, etc. that are transmitted and received from a web server upon connecting to the source code of the corresponding webpage or the webpage, as described above. The image-related data acquisition unit 210 acquires the image-related data, and transmits the image-related data to the video service provision system 100. The image-related data acquisition unit 210 acquires only address information when the cache table of the cache system 10 of the video service provision system 100 is implemented using only address information, and the image-related data acquisition unit 210 transfers address information and expiration time information together when the cache table is implemented using both address information and expiration time information.

The interface management unit 220 of the client terminal 200 functions to provide a user selection interface to the display unit of the client terminal 200 based on the video result information transmitted from the video service provision system 100. It will be apparent that the interface management unit 220 may be implemented in the form of a plug-in in an integrated manner, like the image-related data acquisition unit 210, as described above.

When the image-related data acquisition unit 210 of the client terminal 200 transmits the acquired image-related data to the video service provision system 100 as described above, the video service provision system 100 determines matching video information based on the received image-related data, and transmits video result information corresponding to the determined video information to the client terminal 200. The interface management unit 220 of the client terminal 220 provides a user selection interface via the display unit of the client terminal 200 upon receiving the video result information, thereby allowing, for example, a user event attributable to a mouse input by a user, to be detected.

Figure 5:
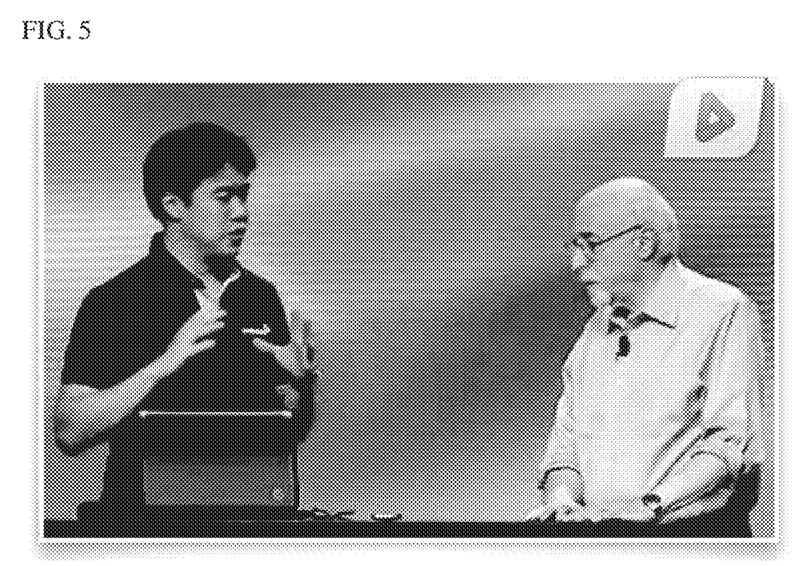
FIG. 5 is a screen shot illustrating a state in which a user selection interface has been displayed along with an image.

The user selection interface may be allowed to be displayed on, for example, the upper right end of the image displayed on the display unit of the client terminal 200. FIG. 5 is a screen shot illustrating a state in which the user selection interface has been displayed along with the image. Referring to FIG. 5, it can be seen that a triangle-shaped user selection interface is provided at the upper right end of the image. A user generates a user event via the operation of clicking the user selection interface using, for example, a mouse. When the user event occurs, the video playback unit 230 (to be described later) of the client terminal 200 transmits a video provision request signal to the video service server 400.

Meanwhile, the video playback unit 230 functions to transmit a video service provision request signal to the video service provision server 400 when the user event occurs via the user selection interface, and receive and play back video data transmitted from the video service provision server 400. The video playback unit 230 provides a video playback interface for receiving and playing back video data via the display unit while transmitting the video service provision request signal to the video service provision server 400. In this case, the video playback interface for playing back video data may be provided at a location determined based on the location information of the image displayed on the display unit of the client terminal. For example, information about coordinates at which the image is located on the display unit may be acquired, and then a location where the video playback interface will be provided on the display unit may be determined based on the coordinate information and information about the size of the video playback interface.

Figure 6:
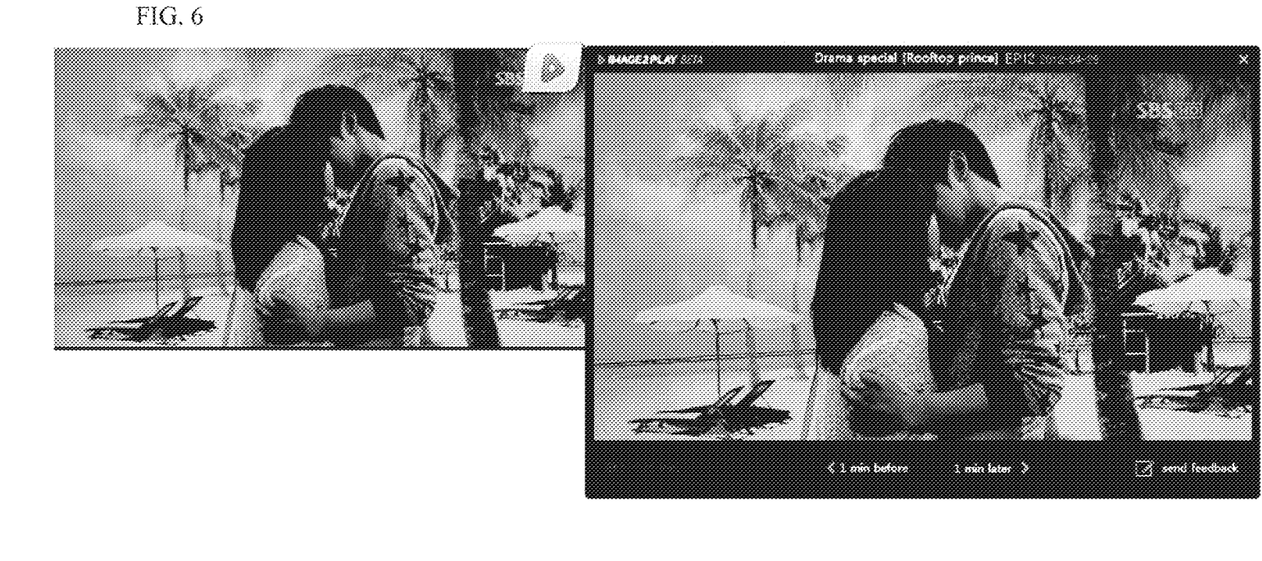
FIG. 6 is a diagram illustrating a state in which a video playback interface has been provided onto the display unit of the client terminal.

FIG. 6 is a diagram illustrating a state in which the video playback interface has been provided onto the display unit of the client terminal 200. FIG. 6 illustrates a state in which the video playback interface has been provided on the right to an image when a user generates a user event by selecting the user selection interface provided on the upper right end of the left image via a mouse click. As illustrated in FIG. 6, when the coordinate information of a portion where an image is located on the display unit and the size information of the video playback interface are considered, it may be possible to provide the video playback interface alongside of the image in the state where the image is not covered as much as possible. This enables a user to easily check whether a video corresponding to the image is played back.

Figure 7:
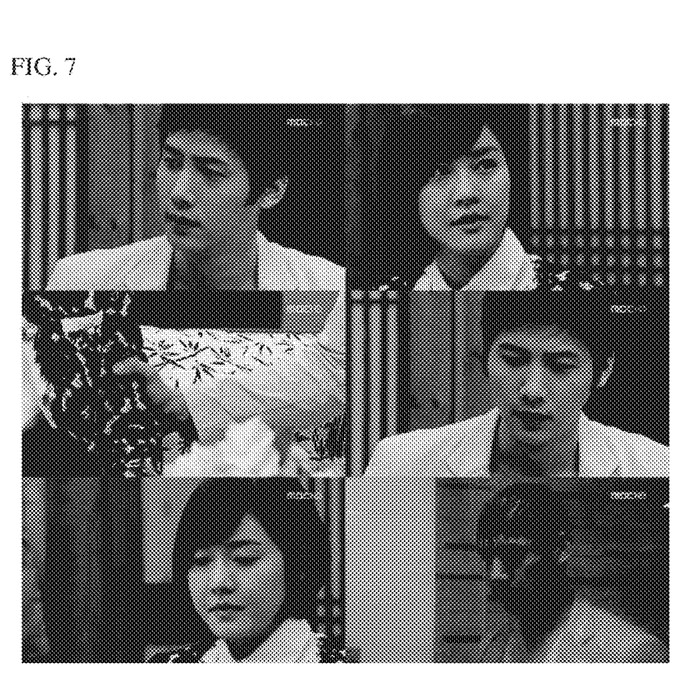
FIG. 7 is a diagram illustrating a case where a plurality of images is mixed in lateral and vertical directions and provided in the form of a single piece of image data.

Meanwhile, with regard to the image provided by the image server 300, there is a case where a plurality of images is mixed in lateral and vertical directions and provided in the form of a single piece of image data, as illustrated in FIG. 7. In order to deal with this case, the fingerprint extraction unit 20 may segment acquired image data into at least one or more pieces of segment image data, and may extract a fingerprint from each piece of segment image data. A conventional technology may be used as a method of segmenting image data into a plurality of pieces of segment image data without change. For example, an edge detection method, a corner detection method, a feature point detection method, etc. may be used. A conventional known method, such as a method of converting images, obtaining gradient values, and then obtaining boundaries between the images based on the gradient values, may be used. Once the image has been segmented into the plurality of pieces of segmented image data, the fingerprint extraction unit 20 extracts a fingerprint from each piece of segment image data. Meanwhile, the matching unit 30 identifies a video ID and a frame ID that match each extracted fingerprint.

When the segment images are $I_1, I_2, \ldots, I_K$, a matching result Result(j) for a single segment image $I_j$ may be obtained in the form of n-best for each piece of segment image data, for example, as follows.

Result(j)=(video ID 1, score 1, frame ID 1), (video ID 2, score 2, frame ID 2), . . . , (video ID n, score n, frame ID n)

When a video ID and a frame ID corresponding to the highest score is Best_Result(j), Best_Result(j) may be obtained for each single segment image $I_j$. In this case, the score refers to a result obtained by scoring a result of a matching algorithm. This results in the obtainment of a total of K Best_Results on the basis of an image before the segmentation. Of these, video ID and frame ID information having the highest frequency, that is, video ID and frame ID information that most frequently appears, may be determined to be video information corresponding to image data before the segmentation.

Furthermore, all video IDs and frame IDs corresponding to Best_Results(j) for respective segment images $I_j$ may be determined to be video information. That is, each of Best_Results for K segment images for a given a single image may be determined to be video information for the given single image. In this case, in the case of the cache table illustrated in FIGS. 2 and 3, a plurality of video IDs and frame IDs are included in video information.

Figure 8A:
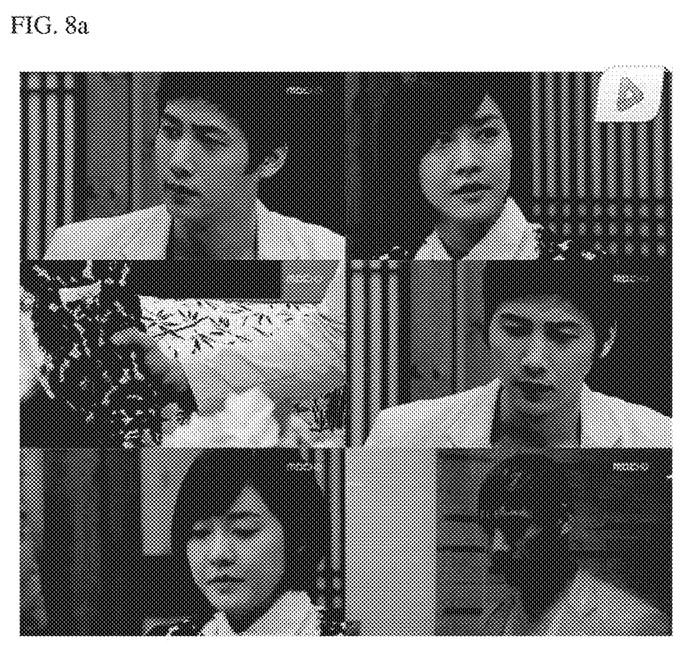
FIGS. 8a and 8b are screen shots illustrating states in which, once a video information has been determined and transmitted to the client terminal, a user selection interface has been provided via the display unit of the client terminal.
Figure 8B:
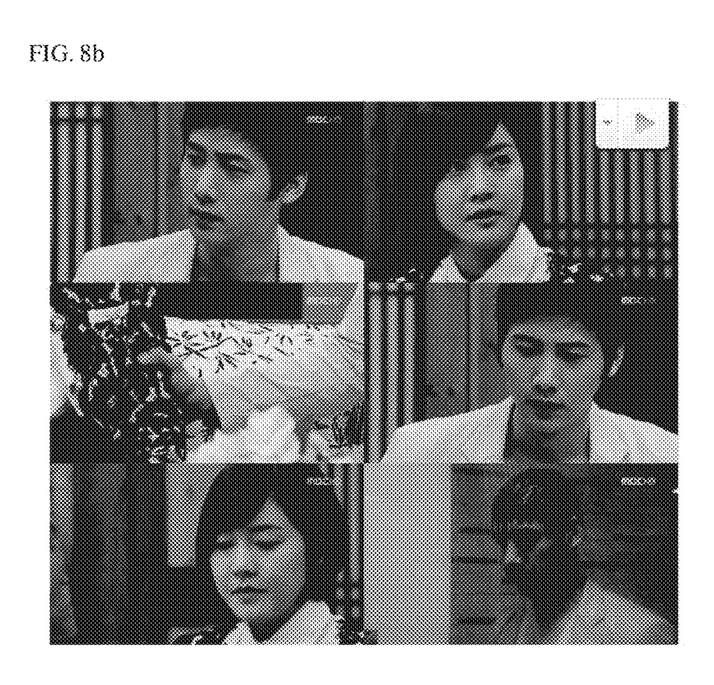

FIGS. 8*a* and 8*b* are screen shots illustrating states in which once the video information determined through the above process has been transmitted to the client terminal 200, the user selection interface has been provided via the display unit of the client terminal 200.

The case of FIG. 8*a* is a case where one of a plurality of pieces of video information for respective segment images is determined to be video information. When a user event, such as an action of clicking the user selection interface provided at the upper right end of the image of FIG. 8*a* using a mouse, is input, video data corresponding to a video ID and a frame ID corresponding to a single piece of video information determined among a plurality of pieces of video information for respective segment images, as described above, is transmitted to and played back in the client terminal 200 through the above-described process.

The case of FIG. 8*b* is a case where all a plurality of pieces of video information for respective segment images are determined to be video information, that is, a case where video information includes a plurality of video IDs and frame IDs. In the case of FIG. 8*b*, it is preferred that video information included in video result information transmitted by the video service provision system 100 includes a plurality of video IDs and frame IDs. Referring to FIG. 8*b*, it can be seen that a separate selection button is provided on the left side of the user selection interface of FIG. 8*a* at the upper right end of an image. When a user presses this separate selection button, a plurality of pieces of video list information corresponding to the respective pieces of video result information is displayed on the display unit, and the user is allowed to select any one of them. Once the user has selected any one of them, a user event corresponding to the selected video occurs.

The above-described method is illustrative. It will be apparent that a video result for image data before segmentation may be obtained from matching results for respective pieces of segment image data using other methods.

Meanwhile, the cache table provided in the cache system 10 of the video service provision system 100 may be implemented without expiration time information as described above. When there is no expiration time information, only address information is used as image-related data. In this case, a corresponding webpage or the image of a webpage may change. In order to deal with this case, the cache table needs to be updated.

Figure 9:
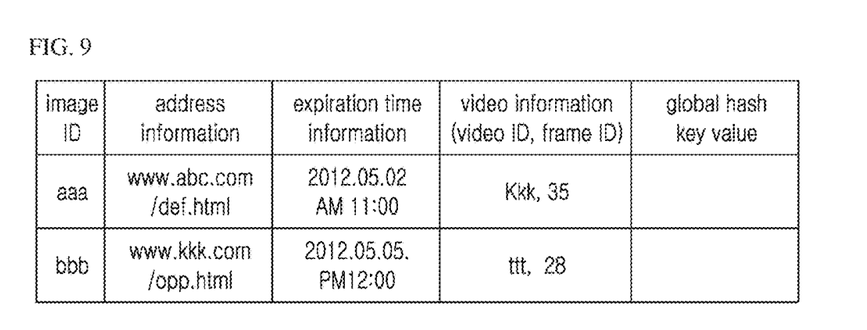
FIG. 9 is a diagram illustrating another example of the cache table according to the present invention.

FIG. 9 is a diagram illustrating another example of the cache table according to the present invention. The cache table of FIG. 9 is different from the cache table of FIG. 3 only in that a global hash key value is further included in association with each image ID. A method of updating a cache table using such a global hash key value is as follows. That is, the cache table may be updated by registering/storing the global hash key value of the average value of specific values in overall image data, the average value of all image pixel (R, G, B) values themselves, comparing the global hash key value of address information (URL information) input every specific period with the global hash key value of the corresponding address information stored in the cache table, and newly performing a matching operation on the overall cache table if the global hash key values are different from each other. In this case, the global hash key value is illustrative, and other types of data may be used. That is, whether the cache system needs to be updated may be determined by storing hash values, that is, comparison targets, from all the data of images corresponding to image IDs that are stored in the cache table and then performing the comparison of a hash value calculated from an input image.

Meanwhile, it will be apparent that the cache table may be updated by simply performing a new matching operation on the overall cache table at regular intervals, in addition to the above method.

Figure 10:
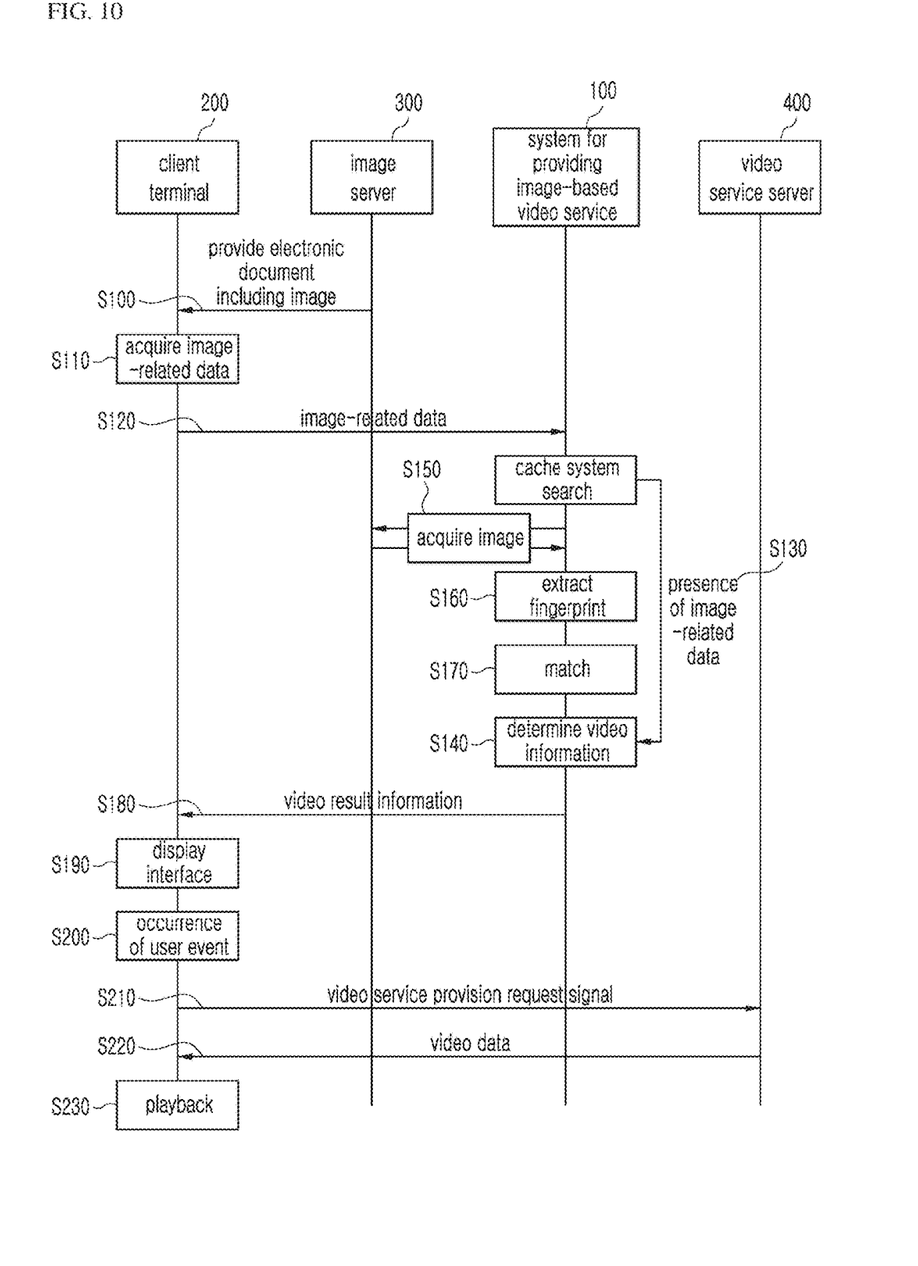
FIG. 10 is a flowchart illustrating an embodiment of a method of providing an image-based video service according to the present invention.

FIG. 10 is a flowchart illustrating an embodiment of a method of providing an image-based video service that is performed by the video service provision system 100 described with reference to FIGS. 1 to 9.

Referring to FIG. 10, first, the client terminal 200 connects to the image server 300 and receives an electronic document including an image from the image server 300 at step S100. The client terminal 200 displays the received electronic document via the display unit and, at this time, the image-related data acquisition unit 210 of the client terminal 200 acquires image-related data, as described above, at step S110. As described above, the image-related data includes address information (URL information), and may further include expiration time information.

The acquired image-related data is transmitted to the video service provision system 100 at step S120. The video service provision system 100 determines video information that matches the received image-related data. This is performed by determining whether the corresponding image-related data is present in the cache table provided in the cache system 10 first, as described above.

If the input image-related data is present in the cache table, video information stored in association with the corresponding image-related data is determined at steps S130 and S140. In this case, at step S140, when the image-related data is configured to include only address information, whether address information is present is determined, and video information (a video ID and a frame ID) stored in association with the corresponding address information is determined if the address information is present. At step S140, when the image-related data is configured to include address information and expiration time information, the comparison of expiration time information is performed if address information is present, and then stored video information is determined in response to a matching case. If there is no match for expiration time information, fingerprint extraction and matching are performed via the fingerprint extraction unit 20 and the matching unit 30 at steps S150 to S170.

Meanwhile, if there is no image-related data, fingerprint extraction and matching are performed via the fingerprint extraction unit 20 and the matching unit 30 through steps S150 to S170, as described above.

The fingerprint extraction unit 20 connects to the image server 300 and acquires image data and image-related data at step S150, and extracts a fingerprint from the acquired data at step S160. Once the fingerprint has been extracted, a video and a frame matching the fingerprint are searched for by referring to the fingerprint database 40 and the found video and frame IDs are determined to be video information, as described above, at steps S170 and S140. Through this process, the video information matching the image-related data transmitted from the client terminal 200 is finally determined to be video information.

Once the video information has been determined, the video service provision system 100 transmits video result information corresponding to the video information to the client terminal 200 at step S180. In this case, the video result information may include video information. Furthermore, as described above, address information used to enable playback from the corresponding frame of a video corresponding to the video information may be further included. Alternatively, the video result information may simply be a notification signal indicating that the video information is present.

Once the client terminal 200 has received the video result information, the interface management unit 2220 provides a user selection interface to the display unit of the client terminal 200, as described with reference to FIG. 5, at step S190.

When a user generates a user event by making a selection through the clicking of a mouse at step S200 after the user selection interface has been provided, the video playback unit 230 of the client terminal 200 transmits a video service provision request signal to the video service server 400, receives video data from the video service server 400, and then plays back the video data at steps S210, S220 and S230.

As described above, when a video ID and a frame ID are included in the video result information, the video service provision request signal may include the video result information. The video service server 400 may search for a corresponding video based on the video ID and the frame ID included in the video result information, and may transmit video data that enables the found video to be played back from a location corresponding to the corresponding frame of the found video.

When address information is included in the video result information, the video service provision request signal includes address information and a frame ID. In this case, the video service server 400 transmits video data, enabling a video corresponding to the corresponding address information to be played back from a corresponding frame, to the client terminal 200.

Meanwhile, as described above, the video service server 400 may be included in and configured within the video service provision system 100.

Furthermore, at steps S160 and S170, in order to deal with a case where a plurality of images is arranged in lateral and vertical directions, an image may be segmented, a fingerprint may be extracted from each of segment images, and corresponding video information may be determined, as described with reference to FIGS. 7 and 8.

Furthermore, when the cache table of the cache system 10 is configured to include only address information, as described above, the cache table may be updated based on, for example, global hash key values, at regular intervals.

Although preferred embodiments of the present invention has been described above, the present invention is not limited to these embodiments. It will be apparent that a verity of variations and modifications can be made based on the attached claims and the accompanying diagrams together with the embodiments within the scope of the present invention.

The invention claimed is:

1. A server, comprising:
   a cache system, comprising a cache table that stores first video information, the first video information including an expiration time for the first video information;
   wherein the server is configured for:
   receiving image-related data comprising a network location for retrieving an image and an expiration time for the image, the expiration time indicating a duration that the image is valid at the network location;

determining whether the first video information stored in the cache table matches the received image-related data based on the network location and the expiration time by at least determining whether the stored expiration time for the first video information matches the received expiration time for the image; and after determining that the first video information does not match the image-related data:

extracting a fingerprint of the image corresponding to the received image-related data, wherein the extracting comprises: (i) segmenting the acquired image data into one or more pieces of segmented image data, and (ii) extracting a fingerprint for at least one piece of the one or more pieces of segmented image data, determining second video information that matches the extracted fingerprint of the image, and transmitting the second video information.

2. The server of claim 1, wherein the server is further configured for:

after determining that the first video information does match the image-related data, transmitting the first video information.

3. The server of claim 1, wherein determining whether the first video information stored in the cache table matches the received image-related data further comprises determining the first video information using the cache table based on the received network location.

4. The server of claim 1, wherein the first video information comprises a video identifier (ID) identifying a video, and a frame ID identifying a frame of the video.

5. The server of claim 1, wherein extracting the fingerprint of an image corresponding to the received image-related data comprises:

acquiring image data corresponding to the image-related data, and extracting an extracted fingerprint for the acquired image data.

6. The server of claim 5, wherein determining second video information that matches the extracted fingerprint of the image comprises:

determining the second video information that matches the extracted fingerprint by at least matching the extracted fingerprint with one or more fingerprints stored in a fingerprint database.

7. The server of claim 5, wherein the server is further configured for:

transmitting the second video information to the cache system, and storing the second video information in the cache table using the cache system, wherein the second video information comprises a video ID and a frame ID matching the extracted fingerprint.

8. The server of claim 1, wherein the server is further configured for:

identifying one or more pieces of the second video information; and determining that the acquired image data matches the second video information by at least matching at least one piece of the one or more pieces of segmented image data with at least one piece of the one or more pieces of the second video information.

9. The server of claim 8, wherein identifying the one or more pieces of the second video information comprises identifying video information corresponding to most frequent video and frame IDs of video and frame IDs included in the one or more pieces of the second video information.

10. The server of claim 8, wherein the server is further configured for storing the one or more pieces of the second video information in the cache table.

11. The server of claim 1, wherein the cache table is updated at regular intervals based on a hash value of image data.

12. The server of claim 1, wherein the second video information comprises a network location for retrieving video data associated with the second video information.

13. A method, comprising:

receiving image-related data at a server, wherein the image-related data comprises a network location for retrieving an image and an expiration time for the image, the expiration time indicating a duration that the image is valid at the network location, wherein first video information is stored in a cache table of the server, and wherein the first video information includes an expiration time for the first video information;

determining, using the server, whether the first video information matches the received image-related data based on the network location and the expiration time by at determining whether the stored expiration time for the first video information matches the received expiration time for the image; and after determining that the first video information does not match the image-related data, the server:

extracting a fingerprint of the image corresponding to the received image-related data, wherein the extracting comprises: (i) segmenting the acquired image data into one or more pieces of segmented image data, and (ii) extracting a fingerprint for at least one piece of the one or more pieces of segmented image data, determining second video information that matches the extracted fingerprint of the image, and transmitting the second video information.

14. The method of claim 13, further comprising:

after determining that the first video information does match the image-related data, the server transmitting the first video information.

15. The method of claim 13, wherein determining whether the first video information stored in the cache table matches the received image-related data further comprises determining the first video information using the cache table based on the received network location.

16. The method of claim 13, wherein the first video information comprises a video identifier (ID) identifying a video, and a frame ID identifying a frame of the video.

17. The method of claim 13, wherein extracting the fingerprint of an image corresponding to the received image-related data comprises:

acquiring image data corresponding to the image-related data, and extracting an extracted fingerprint for the acquired image data.

18. The method of claim 13, wherein the cache table is updated at regular intervals based on a hash value of image data.

19. The method of claim 13, wherein the second video information comprises a network location for retrieving video data associated with the second video information.

* * * * *